United States Patent [19]

Yano

[11] Patent Number: 4,608,680
[45] Date of Patent: Aug. 26, 1986

[54] OPTICAL DISC PLAYER WITH TILT CORRECTION

[75] Inventor: Hajime Yano, Tokyo, Japan

[73] Assignee: Sony Corporation, Tokyo, Japan

[21] Appl. No.: 577,989

[22] Filed: Feb. 8, 1984

[30] Foreign Application Priority Data

Feb. 10, 1983 [JP] Japan .................................. 58-19732

[51] Int. Cl.⁴ ............................................... G11B 7/00
[52] U.S. Cl. .......................................... 369/44; 369/46
[58] Field of Search ..................... 358/342; 369/43–46; 250/201–204

[56] References Cited

U.S. PATENT DOCUMENTS 4,502,134 2/1985 Kondo et al. ......................... 369/46

FOREIGN PATENT DOCUMENTS 0070408 1/1983 European Pat. Off. .............. 369/46

*Primary Examiner*—Robert L. Richardson
*Attorney, Agent, or Firm*—Lewis H. Eslinger; Alvin Sinderbrand

[57] ABSTRACT

An optical disc player operative to cause a light beam to impinge through an object lens on a recording surface of a record disc and to receive a reflected light beam coming through the object lens from the recording surface by photodetecting means so as to reproduce an information signal recorded on the record disc, wherein a first signal varying in response to positional movements of the object lens and a second signal varying in response to variations of a position on the photodetecting means where the reflected light beam is received which result from the positional movements of the object lens are mixed with each other to produce a mixed signal with which an inclination of an optical axis of the light beam incident upon the recording surface with respect to a normal line at a location where the light beam impinges on the recording surface is detected.

11 Claims, 3 Drawing Figures

OPTICAL DISC PLAYER WITH TILT CORRECTION

BACKGROUND OF THE INVENTION

1. Field of the Invention

This invention relates generally to apparatus for reproducing optically an information signal from a record disc rotated thereon, and more particularly to an optical disc player operative to cause a light beam to impinge through an object lens on a recording surface of a record disc and to receive a reflected light beam coming through the object lens from the record disc by a photodetector so as to read an information signal recorded on the record disc.

2. Description of the Prior Art

In an optical disc player for reproducing with a light beam an information signal from an optical record disc having a recording surface on which a spiral record track composed of an arrangement of variations in geometrical shape, such as a plurality of pits, formed therein is provided, the optical record disc is rotated and it is necessary to provide a focus servocontrol arrangement for performing focus servocontrol to maintain correct focus of the light beam projected onto the recording surface of the rotating optical record disc and a tracking servocontrol arrangement for performing tracking servocontrol to maintain the light beam in correct tracking relation to each turn of the spiral recorded track on the rotating optical record disc. Besides, in the case that a reproduced information signal obtained from the optical record disc is required to have a strictly correct time base, that is, the reproduced information signal is a video signal from an optical video disc, for example, it is also necessary to provide a time base correcting servocontrol arrangement for performing time base correcting servocontrol to adjust the light beam to scan such locations on the spiral record track that the reproduced information signal is obtained with a predetermined correct time base, in addition to the focus and tracking servocontrol arrangements.

With the focus servocontrol arrangement, for example, a position of the object lens, which causes the light beam to impinge on the recording surface of the optical record disc, in the direction perpendicular to the recording surface of the optical record disc is controlled to maintain a distance from the object lens to the recording surface in such a state that the light beam is correctly focused on the recording surface. With the tracking servocontrol arrangement, for example, a position of the object lens in a plane parallel with the recording surface of the optical disc is controlled to maintain a location where the light beam impinges on the recording surface on each turn of the spiral record track in the recording surface correctly. Further, with the time base correcting servocontrol arrangement, for example, the position of the object lens in the plane parallel with the recording surface of the optical record disc is controlled to be moved in a direction perpendicular to the direction of the shift caused by the tracking servocontrol arrangement to shift the location where the light beam impinges on the recording surface in a direction along each turn of the spiral record track in the recording surface.

In such a manner as mentioned above, several servocontrols to the light beam impinging through the object lens on the recording surface of the optical record disc are carried out, so that a reproduced information signal is properly obtained. However, notwithstanding such servocontrols, when an optical axis of the light beam impinging through the object lens on the recording surface of the optical record disc is inclined with respect to a normal line perpendicular to the recording surface at a location where the light beam impinge on the recording surface due to deformations of the optical record disc, for example, (such an inclination of the optical axis of the light beam with respect to a normal line perpendicular to the recording surface of the optical record disc at a location where the light beam impinges on the recording surface will be referred to as a skew, hereinafter.) and therefore there is a certain angular space between the optical axis of the light beam and the normal line at the location where the light beam impinges on the recording surface, a spot of the light beam on a certain turn of the spiral record track in the recording surface is undesirably enlarged by coma abberations caused in connection with the object lens, and as a result of this, a reproduced information signal contains increased crosstalk components from adjacent turns of the spiral record track and the frequency characteristic of the reproduced information signal is deteriorated. In particular, in the case where a semiconductor laser device is employed to act as a light source for the light beam, there is a disadvantage that remarkable deteriorations in the reproduced information signal result from even a relatively small skew because a wavelength of a laser light emitted by the semiconductor laser device is relatively long (for example, considerably longer than a oscillation wavelength : 6320 angstroms in the case of a Helium-Neon gas laser device) and an object lens having a relatively large numerical aperture is used for causing such a laser light to focus correctly on the recording surface of the optical record disc, so that the permissible amount of skew is reduced.

In view of the above, it is desired to carry out such a control as to cancel the skew by, for example, varying the direction of the optical axis of the light beam impinging on the recording surface of the optical record disc when the skew occurs. For performing such a control to cancel the skew in the optical disc player, the optical disc player is required to have means for detecting with certainty the skew caused therein and means for producing a signal responding accurately to the amount of detected skew. However, any optical disc player having satisfactory means for detecting the skew and for producing the signal responding to the skew anount has not been previously known.

OBJECTS AND SUMMARY OF THE INVENTION

It is an object of the present invention to provide an optical disc player operative to cause a light beam to impinge through an object lens on a recording surface of a record disc and to detect a reflected light beam coming through the object lens from the recording surface of the record disc for reproducing an information signal recorded on the record disc, which can detect a skew occuring therein accurately and surely.

Another object of the present invention is to provide an optical disc player in which a light beam is directed through an objective lens to a recording surface of a record disc and, after being reflected at the recording surface of the record disc, guided through the object lens to a photodetector so as to received thereby and produce a detected output from which a reproduced information signal can be obtained, which can detect a skew occuring therein accurately and surely with a signal produced to respond to variations caused by the skew of a position on the photodetector where the reflected light beam is received.

According to an aspect of the present invention, there is proposed an optical disc player comprising a light beam source, an optical device including an object lens for directing a light beam from the light beam source to a recording surface of a record disc provided with a spiral record track therein and allowing a reflected light beam from the recording surface of the record disc to pass therethrough, a photodetecting portion for receiving the reflected light beam coming through the object lens to produce in response to the received light beam a detected output from which a reproduced information signal can be obtained, and a control portion containing means for producing a first signal varying in response to variations of a position where the light beam impinges on the recording surface of the record disc, means for producing from the detected output of the photodetecting portion a second signal varying in response to variations of the position on the photodetecting portion where the reflected light beam is received, and means for mixing the first and second signals so as to cancel a component of the second signal which results from the variations of the position where the light beam impinges on the recording surface of the record disc and to produce a third signal indicating a skew occuring in connection with the light beam impinging on the recording surface of the record disc.

With the optical disc player thus constituted in accordance with the present invention, on the occasion of reproducing operation in which the light beam is directed through the object lens to the recording surface of the record disc and the reflected light beam is guided through the object lens to the photodetector to produce the detected output from which the reproduced information signal is obtained, at least one of a skew caused in a direction transverse to each turn of the spiral record track on the record disc and a skew caused in a direction along each turn of the spiral record track can be accurately and surely detected without being harmfully affected by the variations of the position where the light beam impinges on the recording surface of the record disc caused by the shift of the light beam for tracking servocontrol or time base correcting servocontrol. Further, in the optical disc player according to the present invention, appropriate skew servocontrol can be carried out in response to the skew detected thus and consequently an information signal recorded on the record disc can be reproduced with superior quality.

The above and other objects, features and advantages of the present invention will become apparent from the following detailed description taken in conjunction with the accompanying drawings.

DESCRIPTION OF THE PREFERRED EMBODIMENT

Now, one embodiment of optical disc player according to the present invention will be described with reference to the drawings.

Figure 1:
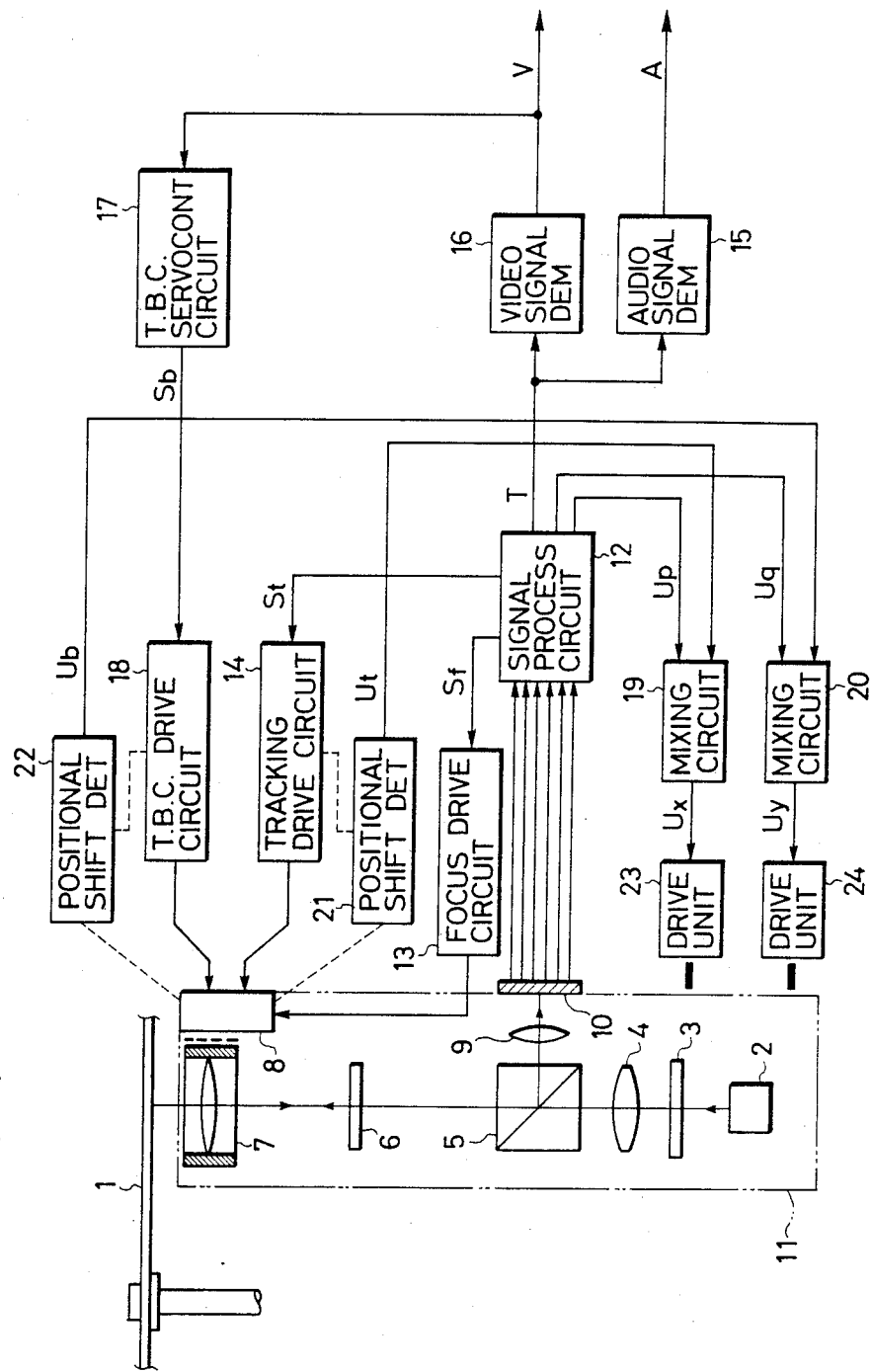
FIG. 1 is a block diagram showing an essential part of one embodiment of optical disc player according to the present invention.

FIG. 1 shows an essential part of one example of the optical disc player of the present invention. In FIG. 1, a record disc 1 is provided as a record medium. This record disc 1 has a spiral record track which is formed with an arrangement of a plurality of pits and in which, for example, a television signal is recorded, and is rotated at a constant angular velocity. In this example, a laser light source 2 which comprises, for example, a semiconductor laser device is used. A laser light beam from the laser light source 2 enters through a grating plate 3 and a collimating lens 4 into a polarized beam splitter 5. The laser light beam having passed through the polarized beam splitter 5 enters through a quarter wavelength plate 6 into an object lens 7 forming an optical head and is focused by the object lens 7 to impinge on a recording surface of the record disc 1. The object lens 7 is arranged to be moved in a direction to approach to or recede from the recording surface of the record disc 1, a direction transverse to each turn of the spiral record track on the recording surface of the record disc 1 and a direction along each turn of the spiral record track on the recording surface of the record disc 1 by a driving device 8 utilizing electro-magnetic force so that focus servocontrol, tracking servocontrol and time base correcting servocontrol are carried out. The laser light beam incident upon the recording surface of the record disc 1 is modulated in intensity and reflected at each turn of the spiral record track and retraces to enter through the object lens 7 and the quarter wavelength plate 6 into the polarized beam splitter 5. This reflected laser light beam is turned at the polarized beam splitter 5 to reach a photodetecting portion 10 through an additional lens system 9. Photodetecting elements constituting the photodetecting portion 10 detect the reflected laser light beam modulated at the record disc 1, that is, a reading light beam coming from the object lens 7 to produce output signals varying in response to variations in the reflected laser light beam. The above mentioned devices, elements and portions designated by reference numerals 2 to 10 inclusive form a single optical arrangement 11 which can be moved in a body.

The output signals of the photodetecting portion 10 are supplied to a signal processing circuit 12 which contains a control circuit for focus servocontrol, a control circuit for tracking servocontrol, a circuit for extracting a television signal and a position detecting circuit for detecting a position on the photodetecting portion 10 where the reflected laser light beam impinges. In the signal processing circuit 12, a focus control signal $S_f$ and a tracking control signal $S_t$ are produced by the control circuit for focus servocontrol and the control circuit for tracking servocontrol, respectively. The focus control signal $S_f$ and tracking control signal $S_t$ are supplied to a focus drive circuit 13 and a tracking drive circuit 14, respectively. The focus drive circuit 13 supplies a focus drive voltage to a driving portion for focus control composed of, for example, an electromagnetic coil in the driving device 8 so as to control the position of the object lens 7 in the direction approach to or recede from the recording surface of the record disc 1 to maintain correct focus of the laser light beam incident upon the recording surface of the record disc 1. On the other hand, the tracking drive circuit 14 supplies a tracking control voltage to a driving portion for tracking control composed of, for example, also an electromagnetic coil in the driving device 8 so as to move the object lens 7 in the direction transverse to each turn of the spiral record track in the record surface of the record disc 1 to shift a position where the laser light beam impinges on the recording surface in the direction transverse to each turn of the spiral record track to be put on a selected turn of the spiral record track.

From the circuit for extracting a television signal contained in the signal processing circuit 12, a television signal T read from the record disc 1 is obtained and supplied to both an audio signal demodulating circuit 15 and a video signal demodulating circuit 16, so that a reproduced audio signal A and a reproduced video signal V are obtained from the audio signal demodulating circuit 15 and the video signal demodulating circuit 16, respectively. The reproduced video signal V is supplied to a time base correcting servocontrol circuit 17 and a time base control signal $S_b$ is obtained at the output end of the time base correcting servocontrol circuit 17 to be supplied to a time base correction drive circuit 18. The time base correction drive circuit 18 supplies a time base correcting voltage to a driving portion for time base correction composed of, for example, an electro-magnetic coil in the driving device 8 so as to move the object lens 7 in the direction along each turn of the spiral record track in the recording surface of the record disc 1 to shift the position where the laser light beam impinges on the recording surface along a selected turn of the spiral record track so that the reproduced video signal V keeps a predetermined correct time base.

Further, detected output signals $U_p$ and $U_q$ both varying in response to variations of the position where the reflected laser light beam impinges on the photodetecting portion 10 are derived from the position detecting circuit in the signal processing circuit 12. The detected output signal $U_p$ varies in response to the variations of the position where the reflected laser light beam impinges on the photodetecting portion 10, which result from the direction of the reflected laser light beam from the recording surface of the record disc 1, is varied in the direction transverse to each turn of the spiral record track, and the detected output signal $U_q$ varies in response to the variations of the position where the reflected laser light beam impinges on the photodetecting portion 10, which result from the direction of the reflected laser light beam from the recording surface of the record disc 1 is varied in the direction along each turn of the spiral record track on the recording surface. These detected output signals $U_p$ and $U_q$ are supplied to one input terminal of a first mixing circuit 19 and one input terminal of a second mixing circuit 20, respectively.

First and second positional shift detectors 21 and 22 for detecting shift of the position where the laser light beam impinges on the recording surface of the record disc 1 caused for the tracking servocontrol and shift of the position where the laser light beam impinges on the recording surface caused for the time base correcting servocontrol, respectively, are provided. The first positional shift detector 21 is supplied with, for example, a signal corresponding to the shift of the object lens 7 made by the driving portion for tracking control in the driving device 8 supplied with the tracking control voltage and produces a detected output signal $U_t$ varying in response to variations of the position where the laser light beam impinges on the recording surface of the record disc 1 in the direction transverse to each turn of the spiral record track caused for the tracking servocontrol, and the second positional shift detector 22 is supplied with, for example, a signal corresponding to the shift of the object lens 7 made by the driving portion for time base correction in the driving device 8 supplied with the time base correcting voltage and produces a detected output signal $U_b$ varying in response to variations of the position where the laser light beam impinges on the recording surface of the record disc 1 in the direction along each turn of the spiral record track caused for the time base correcting servocontrol.

The detected output signal $U_t$ from the first positional shift detector 21 is supplied to the other input terminal of the first mixing circuit 19, and in the first mixing circuit 19 a component corresponding to the detected output signal $U_t$ of the detected output signal $U_p$, that is, a component of the detected output signal $U_p$ which results from the variations of the position where the laser light beam impinges on the recording surface of the record disc 1 caused for the tracking servocontrol is cancelled to produce a mixed signal $U_x$ at the output terminal of the first mixing circuit 19. Accordingly, the mixed signal $U_x$ varies in response to component variations resulting from a skew occuring in respect of the laser light beam incident upon the recording surface of the record disc 1 of the variations of the position where the reflected laser light beam impinges on the photodetecting portion 10 which result when the direction of the reflected laser light beam from the recording surface of the record disc 1 is varied in the direction transverse to each turn of the spiral record track on the recording surface, and becomes zero when the skew does not arise. As a result of this, such a skew as to vary the direction of the reflected laser light beam from the recording surface of the record disc 1 in the direction transverse to each turn of the spiral record track on the recording surface, that is, a radial skew can be detected accurately and surely with the mixed signal $U_x$.

On the other hand, the detected output signal $U_b$ from the second positional shift detector 22 is supplied to the other input terminal of the second mixing circuit 20, and in the second mixing circuit 20 a component corresponding to the detected output signal $U_b$ of the detected output signal $U_q$, that is, a component of the detected output signal $U_q$ which results from the variations of the position where the laser light beam impinges on the recording surface of the record disc 1 caused for the time base correcting servocontrol is cancelled to produce a mixed signal $U_y$ at the output terminal of the second mixing circuit 20. Accordingly, the mixed signal $U_y$ varies in response to component variations resulting from a skew occuring in respect of the laser light beam incident upon the recording surface of the record disc 1 of the variations of the position where the reflected laser light beam impinges on the photodetecting portion 10 which result when the direction of the reflected laser light beam from the recording surface of the record disc 1 is varied in the direction along each turn of the spiral record track on the recording surface, and becomes zero when the skew does not arise. As a result of this, such a skew as to vary the direction of the reflected laser light beam from the recording surface of the record disc 1 in the direction along each turn of the spiral record track on the recording surface, that is, a tangential skew can be detected accurately and surely with the mixed signal $U_y$.

The mixed signal $U_x$ thus obtained as a detected output signal for the radial skew is supplied to a first driving unit 23 for driving the optical arrangement 11 to move an optical axis of the laser light beam incident upon the recording surface of the record disc 1 in a plane having a crossline on the recording surface extending in the direction of the radius of the record disc 1. With the movement of the optical arrangement 11 by the first driving unit 23, skew control in which the direction of the optical axis of the laser light beam incident upon the recording surface of the record disc 1 is varied so as to eliminate the radial skew is carried out. The mixed signal $U_y$ obtained as a detected output signal for the tangential skew is supplied to a second driving unit 24 for driving the optical arrangement 11 to move the optical axis of the laser light beam incident upon the recording surface of the record disc 1 in a plane having a crossline on the recording surface extending in a direction perpendicular to the direction of the radius of the record disc 1. With the movement of the optical arrangement 11 by the second driving unit 24, another skew control in which the direction of the optical axis of the laser light beam incident upon the recording surface of the record disc 1 is varied so as to eliminate the tangential skew is carried out.

Figure 2:
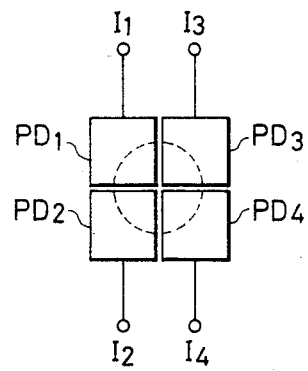
FIG. 2 is a schematic illustration used for explaining one example of a photodetecting portion in the embodiment shown in FIG. 1.

In order to produce the detected output signals $U_p$ and $U_q$ at the position detecting circuit in the signal processing circuit 12, the photodetecting portion 10 comprises, for example, four photodetecting elements $PD_1$, $PD_2$, $PD_3$ and $PD_4$ arranged as shown in FIG. 2 on which a spot of the reflected laser light beam is formed. With such four photodetecting elements, the detected output signal $U_p$ is obtained in response to the shift of the spot of the reflected laser light beam in the direction from the photodetecting elements $PD_1$ and $PD_2$ to the photodetecting elements $PD_3$ and $PD_4$ or vice versa, and the detected output signal $U_q$ is obtained in response to the shift of the spot of the reflected laser light beam in the direction from the photodetecting elements $PD_1$ and $PD_3$ to the photodetecting elements $PD_2$ and $PD_4$ or vice versa. That is, the detected output signal $U_p$ is obtained from the difference between the sum $I_1+I_2$ of an output $I_1$ of the photodetecting element $PD_1$ and an output $I_2$ of the photodetecting element $PD_2$ and the sum $I_3+I_4$ of an output $I_3$ of the photodetecting element $PD_3$ and an output $I_4$ of the photodetecting element $PD_4$, and the detected output signal $U_q$ is obtained from the difference between the sum $I_1+I_3$ of the outputs $I_1$ and $I_3$ and the sum $I_2+I_4$ of the outputs $I_2$ and $I_4$.

Figure 3:
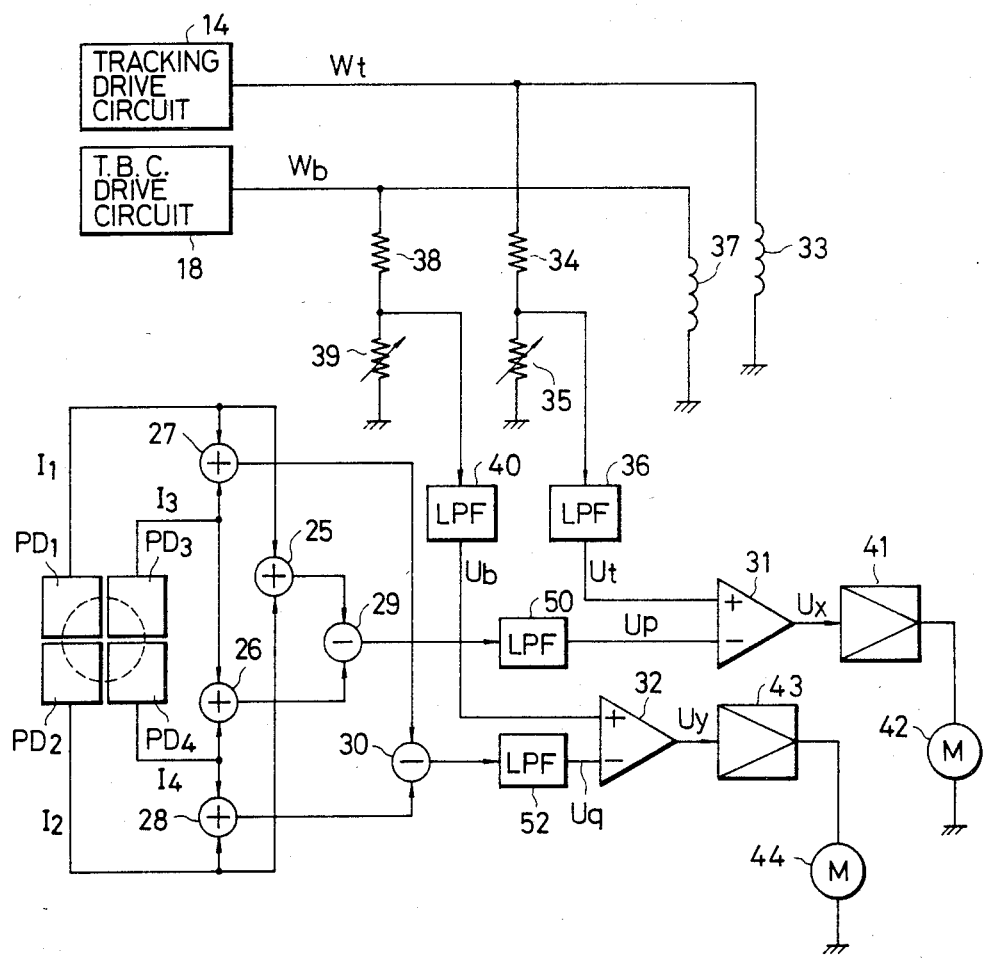
FIG. 3 is a block diagram showing a concrete example of a portion of the embodiment shown in FIG. 1.

FIG. 3 shows a concrete example of a portion of the embodiment shown in FIG. 1 in which the position detecting circuit in the signal processing circuit 12, the first and second mixing circuits 19 and 20, the first and second positional shift detectors 21 and 22, and the first and second driving units 23 and 24 are included. In this example, the position detecting circuit in the signal processing circuit 12 comprises adders 25, 26, 27 and 28 supplied with the outputs $I_1$ to $I_4$ of the photodetecting elements $PD_1$ to $PD_4$ arranged as shown in FIG. 2 to form the photodetecting portion 10, respectively, a subtracter 29 for taking the difference between outputs of the adders 25 and 26, a subtracter 30 for taking the difference between outputs of the adders 27 and 28 and low pass filters 50 and 52 supplied with outputs of the subtractors 29 and 30, respectively, and the detected output signals $U_p$ and $U_q$ are derived from the low pass filters 50 and 52, respectively. The first and second mixing circuits 19 and 20 comprise subtracting amplifiers 31 and 32, respectively.

The first positional shift detector 21 comprises a series connection of a resistor 34 and a variable resistor 35 which are operative to divide the tracking control voltage $W_t$ supplied to the driving portion for tracking control composed of a coil 33 in the driving device 8 from the tracking drive circuit 14, and a low pass filter 36 to a divided tracking control voltage obtained across the variable resistor 35. Since the positional shift of the object lens 7 caused by the driving portion composed of the coil 33 is obtained in response to the tracking control voltage $W_t$, an output of the low pass filter 36 which is obtained by extracting a low frequency component of the divided tracking control voltage forms the detected output signal $U_t$. This detected output signal $U_t$ and the detected output signal $U_p$ derived from the low pass filter 50 are supplied to the subtracting amplifier 31 to produce the mixed signal $U_x$ at the output terminal of the latter. In this case, the mixed signal $U_x$ is made zero when the radial skew is eliminated as a result of adjustment of the variable resistor 35.

The second positional shift detector 22 comprises a series connection of a resistor 38 and a variable resistor 39 which are operative to divide the time base correcting voltage $W_b$ supplied to the driving portion for time base correction composed of a coil 37 in the driving device 8 from the time base correction drive circuit 18, and a low pass filter 40 to a divided time base correcting voltage obtained across the variable resistor 39. Since the positional shift of the object lens 7 caused by the driving portion composed of the coil 37 is obtained in response to the time base correcting voltage $W_b$, an output of the low pass filter 40 which is obtained by extracting a low frequency component of the divided time base correcting voltage forms the detected output signal $U_b$. This detected output signal $U_b$ and the detected output signal $U_q$ derived from the low pass filter 52 are supplied to the subtracting amplifier 32 to produce the mixed signal $U_y$ at the output terminal of the latter. In this case also, the mixed signal $U_y$ is made zero when the tangential skew is eliminated as a result of adjustment of the variable resistor 39.

Further, the first driving unit 23 comprises a driving amplifier 41 supplied with the mixed signal $U_x$ from the subtracting amplifier 31 and a motor 42 for moving the optical arrangement 11 in response to an output of the driving amplifier 41 so as to cancel the radial skew, and the second driving unit 24 comprises a driving amplifier 43 supplied with the mixed signal $U_y$ from the subtracting amplifier 32 and a motor 44 for moving the optical arrangement 11 in response to an output of the driving amplifier 43 so as to cancel the tangential skew.

In the embodiment shown in FIG. 1, a couple of auxiliary laser light beams are used in addition to a main laser light beam to be projected through the object lens 7 on the recording surface of the record disc 1 and, after being reflected at the recording surface, are directed through the object lens 7 to the photodetecting portion 10. The photodetecting portion 10 further comprises a couple of auxiliary photodetecting elements in addition to the photodetecting elements $PD_1$ to $PD_4$ to receive the reflected auxiliary laser light beams, respectively, and the tracking control signal $S_t$ is produced by the control circuit for tracking servocontrol in the signal processing circuit 12 from outputs of the auxiliary photodetecting elements. The grating plate 3 is provided for the purpose of generating such two auxiliary laser light beams.

As modifications possible to be effected without departing from the scope or spirit of the invention, the first and second positional shift detectors 21 and 22 can be arranged to detect the positional shift of the object lens 7 directly with appropriate mechanical means, capacitance detecting means and so forth to produce the detected output signals $U_t$ and $U_b$, respectively. Further, it is possible to arrange the optical disc player of the invention so that only one of the mixed signals $U_x$ and $U_y$ is produced to detect one of the radial skew and tangential skew therein.

What is claimed is:

1. An optical disc player for reproducing optically an information signal recorded in a record track formed on a recording surface of a disc, comprising:
    light source means for generating a light beam,
    optical means including an object lens for directing said light beam to the recording surface of the disc and allowing a reflected light beam from the recording surface of the disc to pass therethrough,
    photodetecting means for receiving said reflected light beam through said object lens to produce in response thereto a detected output from which said information signal can be obtained, and
    control means comprising first detecting means for producing a first signal varying in response to variations of a position where said light beam impinges on the recording surface of the disc, second detecting means responsive to the detected output of said photodetecting means for producing a second signal varying in response to variations of a position on said photodetecting means whereat said reflected light beam is received, and mixing means for mixing said first and second signals so as to cancel a component of said second signal which results from the variations of the position where said light beam impinges on the recording surface of the disc and thereby to produce a third signal with which an inclination of an optical axis of said light beam relative to a line perpendicular to said recording surface of the disc at a point where said light beam is incident upon the recording surface of the disc can be detected.

2. An optical disc player according to claim 1, wherein said first detecting means comprises positional shift detecting means for detecting shift in position of said object lens.

3. An optical disc player according to claim 2, wherein said positional shift detecting means comprises a circuit for generating a voltage varying in response to variations in a driving voltage supplied to driving means for causing said object lens to have positional shift.

4. An optical disc player according to claim 1, wherein said photodetecting means comprises first, second third and fourth photodetecting elements and a subtracting circuit for making the difference between the sum of outputs of said first and second photodetecting elements and the sum of outputs of said third and fourth photodetecting elements.

5. An optical disc player according to claim 1, wherein said first detecting means comprises signal generating means for generating said first signal when said object lens is moved in a direction transverse to the record track on the disc.

6. An optical disc player according to claim 5, wherein signal generating means comprises means for detecting the movement of said object lens in the direction transverse to the record track on the disc and producing an additional detected output.

7. An optical disc player according to claim 1, wherein said second detecting means comprises signal generating means for generating said second signal when the position on said photodetecting means where said reflected light beam is received is shifted as a result of movement of said object lens in a direction transverse to the record track on the disc.

8. An optical disc player according to claim 7, wherein said signal generating means comprises means for detecting the shift of the position on said photodetecting means where said reflected light beam is received which results from the movement of said object lens in the direction transvserse to the record track on the disc and producing an additional detected output.

9. Apparatus to detect the amount of inclination between an optical axis of a reading light beam produced by a movable optical readout lens assembly and a rotating disc having information recorded thereon in a spiral track, said inclination being relative to a line perpendicular to a surface of said disc at a location where said light beam impinges on said surface, such information being read out by the light beam from the readout lens assembly being reflected by the disc, comprising:
    photodetector means receiving the light beam reflected by the disc and producing an information output in response thereto;
    detector means associated with said optical lens readout assembly for detecting positional variations therein and producing an output in response thereto;
    signal processing means receiving said information output from said photodetector means and producing an output in response to variations of the position on said photodetector means of said reflected light beam; and
    mixing means for mixing said output from said detector means and said output from said signal processing means and producing therefrom an inclination indication output for use in correcting such inclination.

10. Apparatus according to claim 9, in which said photodector means comprises first, second, third, and fourth photodetecting segments, each said segment producing a respective output signal and being arranged mutually adjacent, said segment output signals being fed to adder means included in said signal processing means for summing the outputs of said first and second photodetecting segments and producing a first output and summing the outputs of said third and fourth photodetecting segments and producing a second output and including subtracting means for taking the difference between the first and second outputs and producing the output from said signal processing means fed to said mixing means.

11. Apparatus according to claim 9, in which said mixing means comprises differential amplifier means having a first input connected to said detector means and a second input connected to said signal processing means.

* * * * *